United States Patent

[11] 3,576,565

| [72] | Inventor | Hansrichard Schulz<br>Villingen, Black Forest, Germany |
| --- | --- | --- |
| [21] | Appl. No. | 769,867 |
| [22] | Filed | Oct. 23, 1968 |
| [45] | Patented | Apr. 27, 1971 |
| [73] | Assignee | Saba Schwarzwalder Apparate-Bau-Anstalt<br>August Schwer Schne GmbH,<br>Villingen, Black Forest, Germany |

[54] ARRANGEMENT FOR MEASURING SHORT DISTANCES
9 Claims, 6 Drawing Figs.

| [52] | U.S. Cl. | 343/14,<br>340/258, 343/12 |
| --- | --- | --- |
| [51] | Int. Cl. | G01s 9/23 |
| [50] | Field of Search | 343/12, 14;<br>340/258, 258 (B), 258 (C), 258 (D); 324/71 |

[56] References Cited
UNITED STATES PATENTS

| 2,400,309 | 5/1946 | Kock | 340/258UX |
| --- | --- | --- | --- |
| 3,237,191 | 2/1966 | Bojko | 340/258C |
| 3,314,066 | 4/1967 | Schwartz | 340/258C |
| 3,325,811 | 6/1967 | Earp | 343/12X |
| 3,422,431 | 1/1969 | Hafner | 340/258X |

Primary Examiner—Rodney D. Bennett, Jr.
Assistant Examiner—Joseph G. Baxter
Attorney—Michael S. Striker ABSTRACT: A carrier signal is applied to the primary of a transformer whose secondary is center tapped. One end of the secondary winding is connected to an antenna establishing an electric or magnetic field. The other end of the secondary winding is connected to a dummy antenna which compensates for the first antenna impedance before the field established by the antenna is distorted by the target to which the distance is to be measured. When the target enters the field a signal appears at the center tap of the secondary which is amplified, demodulated by a synchronous demodulator keyed by the carrier, again amplified and fed either to an indicating instrument or a motor which serves to rebalance the bridge and whose shaft serves as an indication of the distance to the object. The first above-mentioned amplification is accomplished by a variable gain receiver amplifier, so that the output indication is a linear function of distance to the target.

Inventor:
HANSRICHARD SCHULZ

By: Michael S. Striker
Attorney

ARRANGEMENT FOR MEASURING SHORT DISTANCES

CROSS REFERENCE TO RELATED APPLICATIONS

The present application is related to my copending U.S. Pat. application Ser. No. 769,869, filed simultaneously, entitled: Variable Gain Amplifier.

BACKGROUND OF THE INVENTION

This invention relates to the measurement of distance to a target which is located at a relatively short distance from the measuring instrument.

In particular it relates to an arrangement for measuring the distance to such a target when the distance is less then 10 meters.

The arrangement according to this invention is also useful for measuring the rate of change of distance, or velocity of the target with respect to the measuring instrument.

In known arrangements of this type the travelling time of a pulse transmitted towards a target and reflected back from said target are used to determine the distance from the target and the rate of change of distance. When the pulses travel through the air, these pulses may be in the form of electromagnetic wave energy, while for measurement under water ultrasonic waves are used.

For example, a method of measuring the distance between two flying objects is known wherein the difference is traveling time between measuring pulses sent directly to the target and those reflected from earth are utilized under consideration of the present altitude of each of the flying objects. However this type of measuring instrument is only useful for the measuring of greater distances, but is not applicable for the measurement of distances under 10 meters.

Further related to this invention are protective arrangements wherein, for example, and electric field is generated throughout the room to be protected by means of an open capacitor which determines the frequency of an oscillator. If the electric field of this capacitor is changed due to the entrance of an undesired object, then the capacity of the capacitor changes and therefore causes a change in the oscillator frequency. This change is oscillator frequency in turn causes an alarm signal to be generated or a control arrangement to start functioning.

Known protective arrangements for machines work on a similar principle. For example a hand introduced between a cutting tool and a cutting surface may cause a control mechanism to shut off the machine. For this type of purpose electromagnetic waves may also be used. The fields set up by these waves are disturbed by the introduction of the hand causing a frequency change in an oscillator and thus the desired shutoff of the machine.

Mine detectors work on a similar principle. For example the magnetic field of an open coil is changed in the presence of a metallic object. This in turn causes a warning signal to be generated. This type of arrangement which uses the inductive or capacitive detuning of an oscillator is only useful for measuring small distances, for example distances under 1 meter or alternatively for use in qualitatively determining the presence of an object within the generated field. The conventional arrangements are not useful for accurate measurement of distances, since the capacitive or inductive reactances do not vary linearly with the distance to the target. The reactances vary to a fist approximation as a reciprocal sixth power to the distance to the target.

Thus for such a protective system or alarm generating arrangement the sensitivity of the measurement decreases greatly with increasing distance to the target. An increase of the measuring sensitivity by use of more sensitive frequency discriminators is limited by the obtainable frequency stability of the oscillator. On the other hand the great dependence of the measured quantity on the distance from the target results in a very strong deviation from linearity, thus allowing only short distances to be covered.

Another method is known which does not have the disadvantages described above. In this method or arrangement the distance between the measuring station and the target is determined by a measurement of the phase difference between the transmitted wave and the wave received after reflection from the object. However, this method or arrangement must operate in the microwave region. For operation in such a region it is generally necessary to obtain a permit from the applicable government agency. For this reason it becomes extremely desirable to operate at a lower frequency.

SUMMARY OF THE INVENTION

It is an object of this invention to furnish a measuring arrangement for measuring distances which are small relative to the wave length of the measuring signals.

It is a particular object of the present invention to furnish an arrangement for measuring distances which encompasses the range of from several millimeters to at least 10 meters, thus being useful for controlling the landing and takeoff of airplanes, since the distance between the plane and the landing strip can be accurately determined even from several meters downwards to the actual landing of the plane.

It is a further object of this invention to furnish a measuring arrangement for measuring short distances as required in the navigation of ships in narrow straits.

It is also an object of this invention to furnish such a distance measuring arrangement for use in monitoring devices, for railroad signalling, and for traffic counts.

This invention constitutes an arrangement for measuring short distances between a given location and a target. In particular, it comprises oscillator means for generating a carrier signal having a wavelength which is long relative to the distance to be measured. It further comprises signal radiating means located at said given location for establishing a field, said signal radiating means having an operating characteristic which changes upon external distortion of said field caused by said target. Balanced bridge means including said signal radiating means receive said carrier signal and generate a control signal varying with changes in the operating characteristic of said signal radiating means. Further comprised are synchronous demodulator means, keyed by said carrier signal, for furnishing an indicator signal corresponding to said control signal, whereby said indicator signal yields an indication of the distance between said given locations and said target.

The novel features which are considered as characteristic for the invention are set forth in particular in the appended claims. The invention itself, however, both as to its construction and its method of operation, together with additional objects and advantages thereof will be best understood from the following description of specific embodiments when read in connection with the accompanying drawing.

DESCRIPTION OF THE PREFERRED EMBODIMENTS

Figure 1:
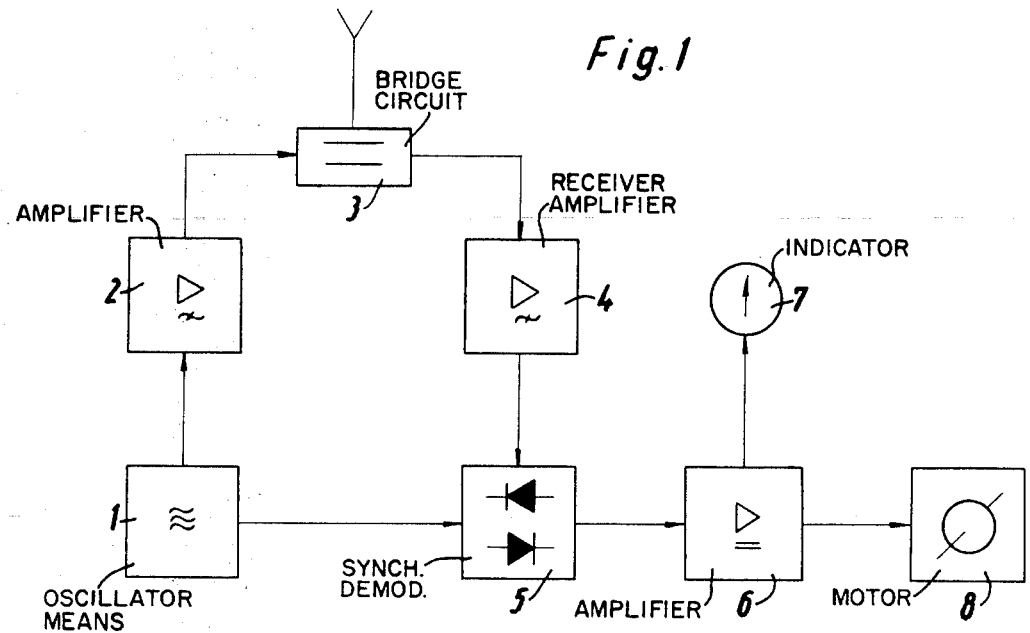
FIG. 1 is a block diagram of a distance measuring arrangement using a single antenna for transmitting and receiving.

FIG. 1 is a block diagram showing an arrangement according to this invention wherein one antenna is used for transmitting and receiving of unmodulated carrier signals. Oscillator means indicated as 1 in FIG. 1 generate a carrier signal preferably having a frequency of less than 10kHz. This signal is amplified in amplifier stage 2 and is also used as a keying signal for synchronous demodulator means 5. The carrier signal is transmitted to the antenna by a balanced bridge 3. The antenna generates a quasistationary electromagnetic field in space. Whether the magnetic or electric field predominates depends on the type of antenna used.

The carrier or measurement signal is furnished to the bridge in such a way that the signal is furnished simultaneously to the antenna and, in phase opposition, to compensating means, namely a dummy antenna. The received or control signal is derived from the other diagonal of the bridge. In the absence of the target the bridge is balanced.

However, if the target appears in the field generated by the antenna the carrier signal at the antenna is changed either in amplitude or in phase. This unbalances the bridge, causing a control signal to be generated. This signal is amplified in receiver amplifier means 4 and demodulated in synchronous demodulator 5. The synchronous demodulator 5 is keyed by the signal furnished by the oscillator 1. The demodulated signal, herein called indicator signal, may be further amplified by amplifier 6 if required and the resulting signal is furnished to indicator means which may be an electromechanical measuring instrument as shown at 7 or a servomotor shown at 8. If it is a servomotor, the shaft of the motor may be used to activate means for rebalancing the bridge. In this case the position of the shaft of the motor is indicative of the distance from the target.

The synchronous demodulator used in this invention has several advantages. First, it serves to suppress quadrature components and thus yields a high selectivity without use of narrow band selective filters. Secondly, a usable indicator signal can be obtained with use of only a single receiver amplifier.

Figure 2:
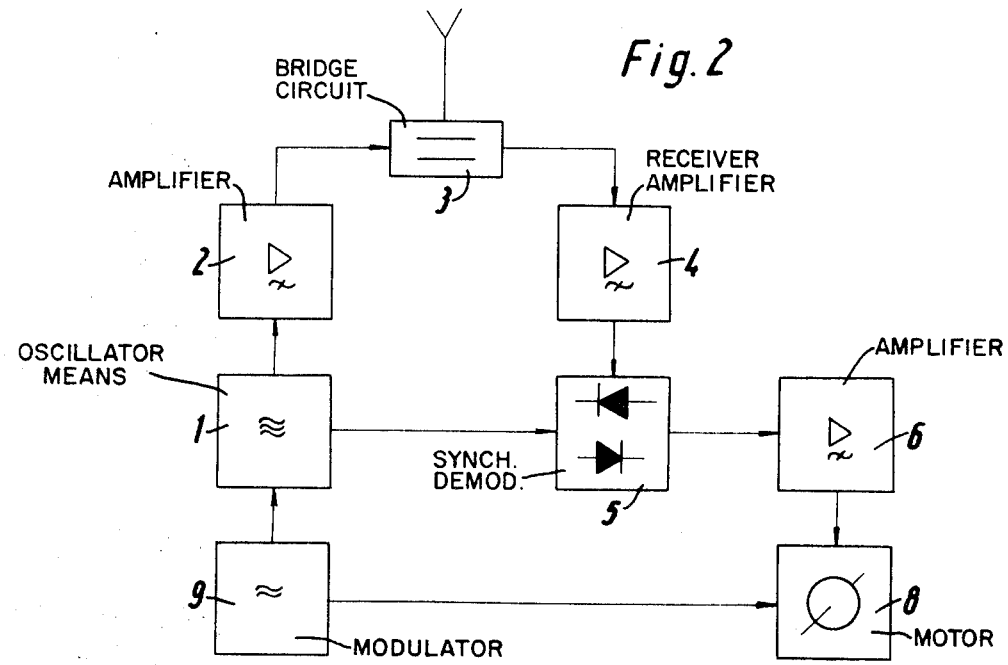
FIG. 2 is an arrangement as shown in FIG. 1 using additional amplitude modulation.

FIG. 2 shows an arrangement similar to FIG. 1, except that an amplitude modulated carrier signal is used. The modulation signal is generated in means for generating a modulation signal, denoted stage 9. The frequency of the modulation signal is a low frequency, for example 60 or 400 Hz. These signals may thus be derived from a separate stage 9 or else directly from a power source.

The stages numbered 1 through 5 operate in the same fashion as in FIG. 1. However the amplifier 6 must be an AC amplifier suitable for the low frequency modulation signal derived from the synchronous demodulator. In a preferred embodiment of this type of arrangement the indicator signal furnished by amplifier 6 is applied to one phase of a two-phase motor 8, whose other phase is supplied with a reference signal comprising the output of the modulation stage 9, phase shifted by 90°. The means for shifting said modulation signal by 90° are not shown in FIG. 2. The rotating field set up by these two signals may be used for indicating or automatic correction.

Figure 3:
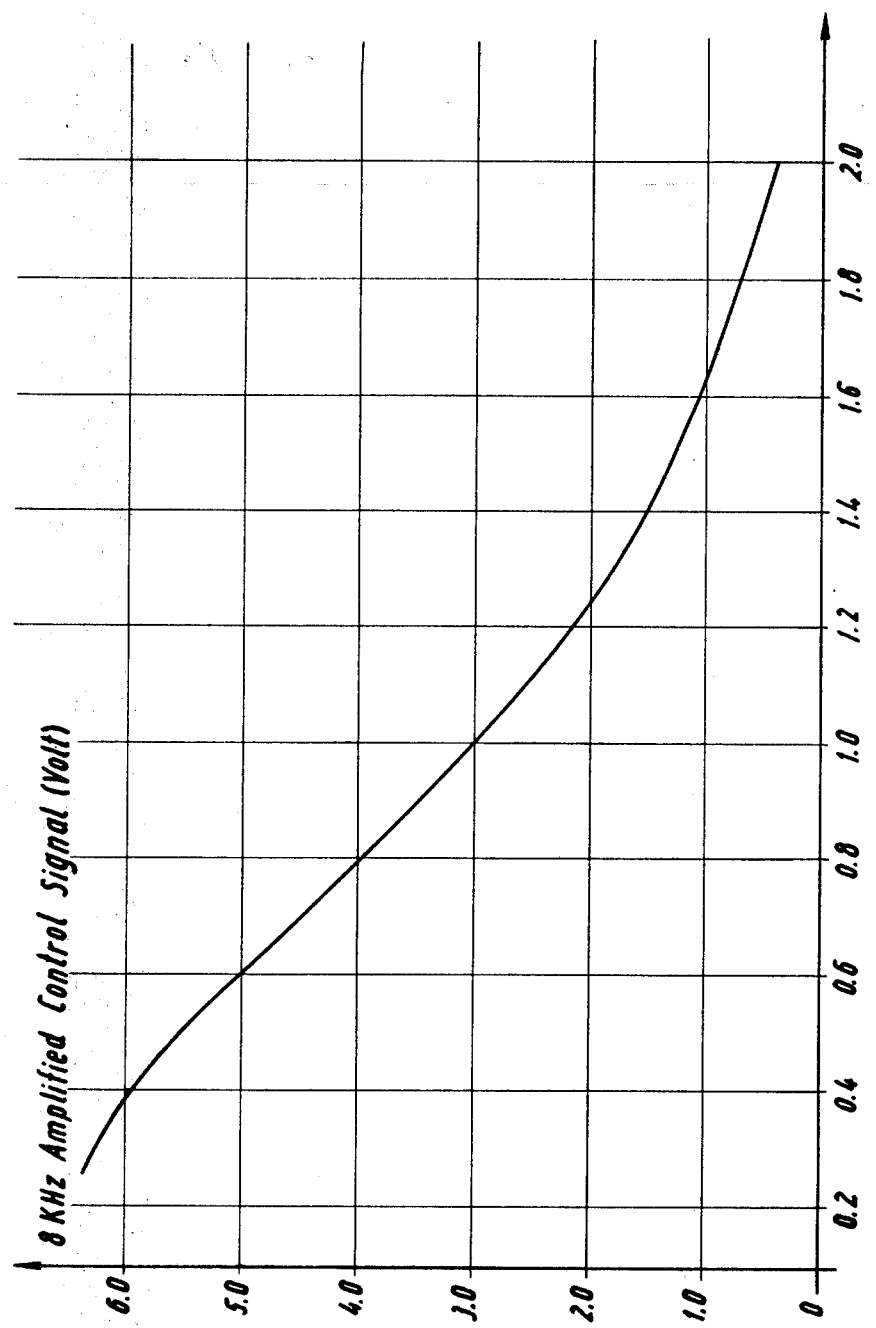
FIG. 3 shows the variation of amplified control signal amplitude with measured distance from the target.
Figure 4:
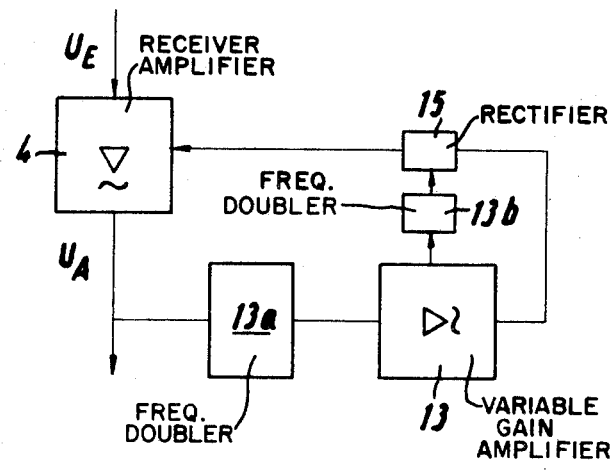
FIG. 4 is a block diagram of the preferred amplifier furnishing the characteristic shown in FIG. 3.

FIG. 3 is a curve showing the output voltage of the receiver amplifier means, amplifier 4 in FIG. 1, as a function of the distance from the target to the antenna, when variable gain amplifier means as indicated by the stage 13 in FIG. 4 are used in conjunction with the aforementioned amplifier stage 4. This output voltage, one embodiment of an amplified control signal, is seen to vary linearly with the distance from the target of the antenna. While in this particular curve a range of only 2 meters is covered, a change of amplifier components can readily yield ranges up to 10 meters. The operation of the arrangement of FIG. 4 by means of which this characteristic is obtained will now be discussed briefly. A detailed description of the operation of the complete circuits of FIG. 4 is furnished in the cross-reference application, filed simultaneously herewith. It should be noted that while for purposes of clarity the amplified stage 13 only is referred to as a variable gain amplifier in the present application, the term variable gain amplifier in the cross-reference application applies to the total arrangement including amplifier 4.

Figure 5:
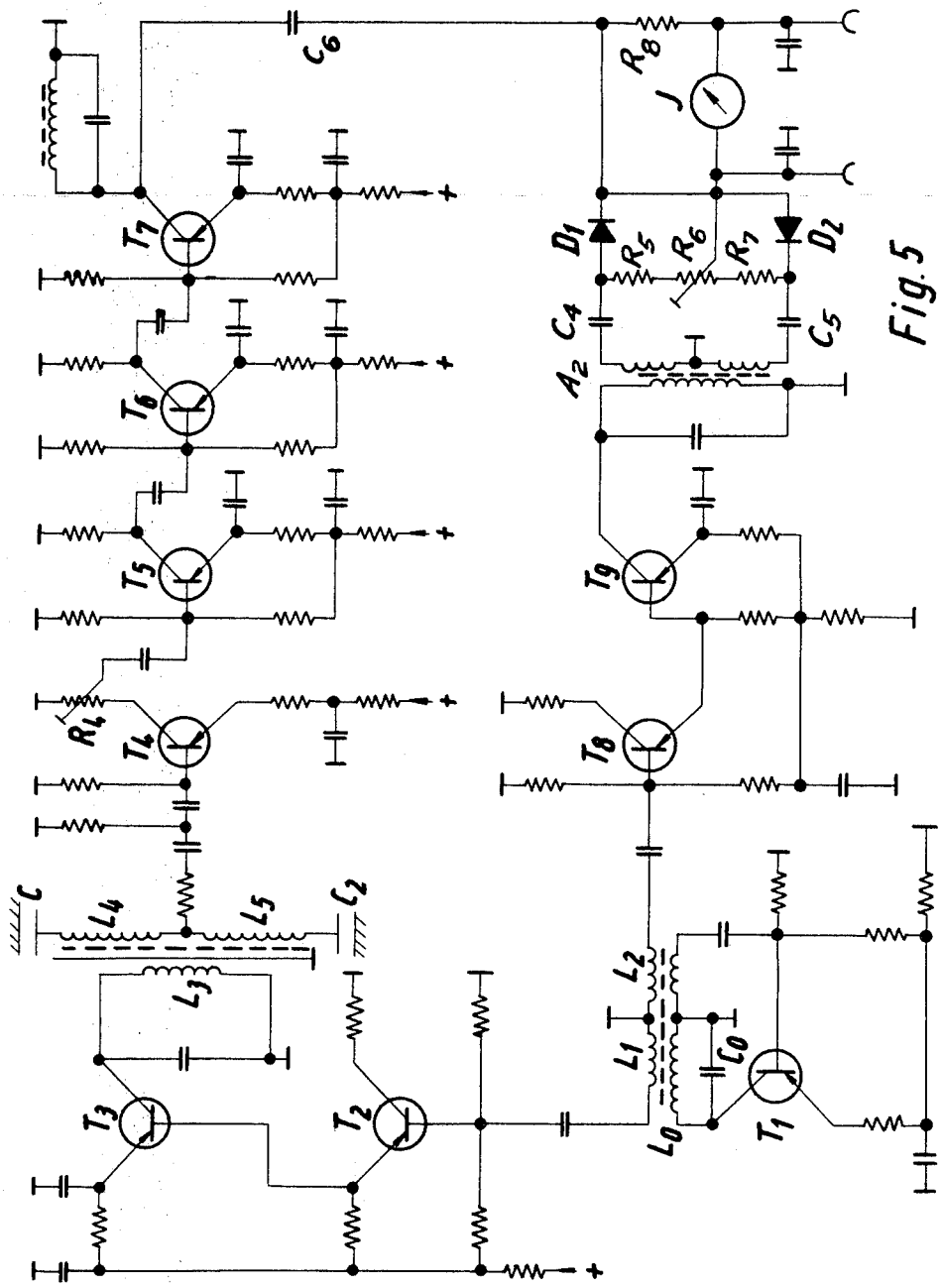
FIG. 5 is a circuit diagram of an embodiment of the arrangement shown in FIG. 1.

Variable gain amplifier stage 13 is loosely coupled to the output of stage 4, or T7 of FIG. 5 via frequency converter means 13a which double the frequency of the 8 kHz. amplified control signal. In stage 13b the fourth harmonic of the 8 kHz amplified control signal is generated and the resulting signal is rectified in stage 15. This rectified signal is fed back to the input of amplifier 4, or the base of $T_5$, FIG. 5. It may further be used to control the gain of amplifier stage 13 itself. This arrangement results in a completely stable control with a very short time constant. It further results, as shown in FIG. 3, in a characteristic wherein the amplified control voltage is substantially linear with the distance between the target and the antenna.

When an arrangement having the characteristic as shown in FIG. 3 is used, it is also possible to obtain the time rate of change of distance, by differentiating the indicator signal, or output of stage 5, FIG. 1. It is further possible to determine the slope of the time rate of change of distance, or the second derivative, and to use these values either for a direct indication or for automatic control, thus allowing compensation to be made for the mechanical inertia of the measuring arrangement. This mode of operation may be for example useful in ship traffic, wherein the great inertia of the ship requires steering corrections sufficiently in advance of any possible collision with either a fixed or moving object.

FIG. 5 shows the circuit diagram of the embodiment of the invention shown in block diagram form in FIG. 1. The carrier signal, of for example 8kHz. is generated in the collector circuit of transistor $T_1$ by the resonant circuit comprising capacitor $C_0$ and inductor $L_0$. Said transistor $T_1$ and its associated components constitute the carrier signal generating means. The carrier signal is applied to the base of a transistor $T_2$ by means of an inductor $L_1$ and a coupling capacitor. The transistor $T_2$ is connected in an emitter following arrangement, thus presenting a high input impedance to the carrier signal generating means. The output of the emitter follower stage comprising transistor $T_2$ is applied to the base of a transistor $T_3$ which serves as a power amplifier and has a tuned circuit in the collector circuit which is tuned to the carrier frequency. The balanced bridge means comprise a transformer having a primary $L_3$, which is part of the tuned circuit in the collector circuit of $T_3$. Secondary winding of the transformer has a center tap and a first and second end terminal, the portion of the secondary winding between the center tap and the first terminal being designated $L_4$, while that between the center tap and the second end terminal is designated $L_5$. The first end terminal is connected to ground by means of a capacitor C which serves as the signal radiating means, while the second end terminal is connected to ground by means of a dummy antenna designated $C_2$. The impedance of the dummy antenna $C_2$ serves to balance the bridge when no target is in the field radiated by antenna C. The control signal is derived from the center tap and fed via high pass filter to the base of transistor $T_4$. The signal furnished by load resistor $R_4$ in turn is amplified in transistor stages $T_5$, $T_6$ and $T_7$. Transistor stages $T_4$, $T_5$ and $T_6$, $T_7$ jointly constitute a receiver amplifier.

The carrier signal is also coupled to the base of a transistor $T_8$ by means of a coil $L_2$ and a coupling capacitor. Transistor $T_8$ and a subsequent transistor $T_9$ and their associated components serve as amplifiers for the keying signal. The synchronous demodulator means denoted by reference signal symbol 5 in FIG. 1 comprise diodes $D_1$ and $D_2$. The cathode of diode $D_1$ is connected at a common point to the anode of diode $D_2$. The anode of diode $D_1$ is connected to the cathode of diode $D_2$ by a series resistance combination comprising resistors $R_5$, $R_6$ and $R_7$, in parallel with which is the series combination of a capacitor $C_4$, the secondary winding of a transformer $A_2$ having a center tap connected to ground and a capacitor $C_5$. A coupling capacitor $C_6$ connects the collector of transistor $T_7$ to the cathode of diode $D_1$. Also connected to the cathode of diode $D_1$ is a resistor $R_8$ whose second terminal is connected to one terminal of the measuring instrument J whose other terminal is connected to the common point of the diodes $D_1$ and $D_2$.

The operation of this circuit of FIG. 5 is as follows. As mentioned above, the condenser C serves as an antenna and establishes a quasistationary field, while capacitor $C_2$ serves as a dummy antenna. When a target is within the field, the balanced bridge becomes unbalanced, so that a control signal appears at the center tap. This is amplified by the following receiver amplifier stages. This receiver amplifier has a symmetrical pass curve which has a maximum amplification at 8kHz. This amplifier transmits an amplified control signal to the diodes $D_1$ and $D_2$ of the synchronous demodulator or phase bridge, which is constructed as a symmetrical bridge demodulator in the embodiment of FIG. 5, In this bridge demodulator the amplified control signal is compared to the keying signal which is furnished at the other bridge diagonal symmetrically, by in phase opposition. Through this comparison the indicator signal is derived. This indicator signal is applied to the indicator means, either in electromechanical measuring instrument J or automatic means for rebalancing the bridge during measurement.

Figure 6:
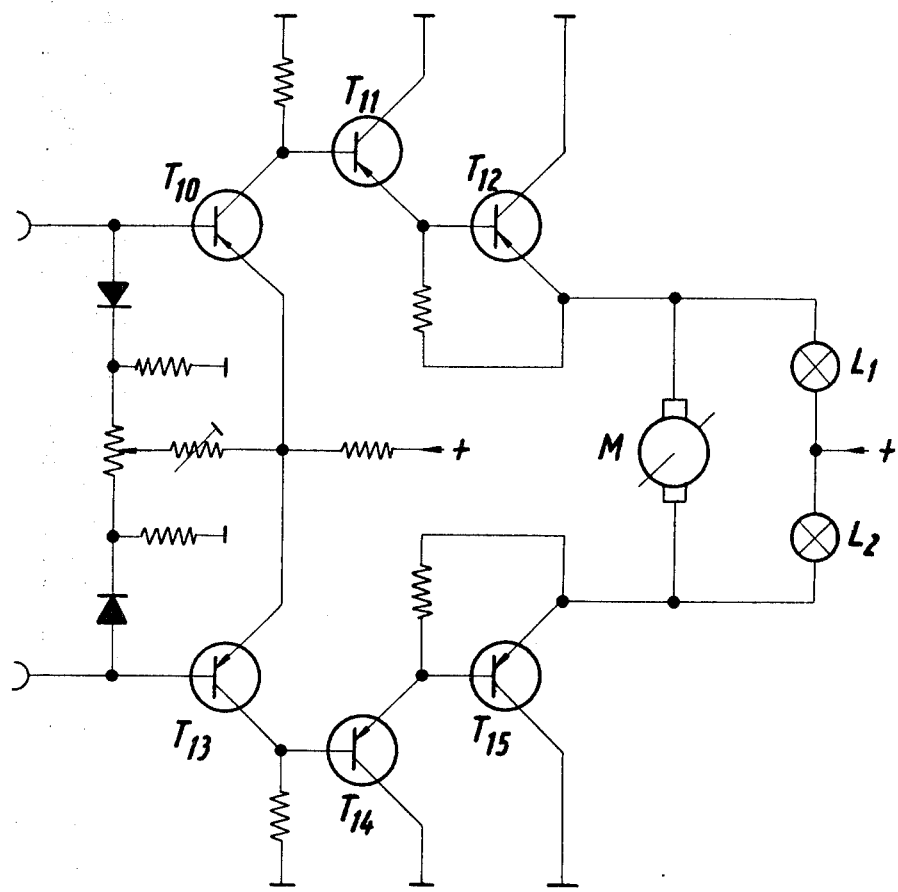
FIG. 6 is a circuit diagram of an amplifier for driving a motor used as indicator.

FIG. 6 is a circuit diagram of one embodiment of the amplifier stage donated by 6 in FIG. 1. It consists of two parallel channels respectively comprising transistors $T_{10}$, $T_{11}$, $T_{12}$ and transistors $T_{13}$, $T_{14}$, and $T_{15}$. The motor M is arranged between the outputs of the two amplifier channels. This motor serves to change the capacitance of capacitor C or capacitor $C_2$ in such a manner as to rebalance the bridge in the presence of a target in the field of capacitor C. The two lamps $L_1$ and $L_2$ which are arranged in parallel with the motor M serve to indicate the direction of movement of the target, since the intensity of illumination of each varies with the position of the target.

A reliable distance measurement may be obtained with such an arrangement if the motor shaft is connected to a rotatable condenser which serves as a trimmer capacitor in the balanced bridge arrangement. This trimmer capacitor is continually turned until the bridge is rebalanced.

This arrangement further permits that a predetermined distance may be kept between the target and the antenna, for example by changing the position of the antenna by means of the motor in such a way that this predetermined distance is maintained.

Furthermore this amplifier in accordance with FIG. 6 may be used to energize an alarm system or other control functions if a predetermined distance of the target from the antenna is either exceeded, or in the case of a maximum distance, the distance between the target and the antenna becomes less than said minimum distance.

As discussed above in relation to FIG. 2, it is possible also to work with an amplitude modulated carrier frequency. Here the output of the synchronous demodulator means is applied to one phase of a two-phase motor after amplification. Simultaneously the modulation signal, rotated by 90°, is applied directly to the second winding of the two-phase motor. In this way the indicator signal for a desired distance (motor null) becomes independent of the amplifier components.

While this invention has been illustrated and described as embodied in a system using particular circuits for carrying out the indicated functions, it is not intended to be limited to the details shown, since various modifications and circuit changes may be made without departing in any way from the spirit of the present invention.

Without further analysis, the foregoing will so fully reveal the gist of the present invention that others can be applying current knowledge readily adapt it for various applications without omitting features that, from the standpoint of the prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended.

I claim:

1. Arrangement for measuring short distances between a given location and a target, comprising in combination, oscillator means for generating a carrier signal having a wave length which is long relative to said distance distance to be measured; signal radiating means located at said given location for establishing a field, said signal radiating means having an operating characteristic which changes upon external distortion of said field caused by said target; balanced bridge means for receiving said carrier signal and generating a control signal varying with said changes in operating characteristic of said signal radiating means; and synchronous demodulator means, keyed by said carrier signal, for furnishing an indicator signal corresponding to said control signal, whereby said indicator signal yields a unidirectional indication of the distance between said given location and said target.

2. An arrangement as set forth in claim 1, wherein said balanced bridge means comprise transformer means having a primary winding for receiving said carrier signal, and a secondary winding having a center tap and a first and second end terminal; wherein said signal radiating means is connected to said first end terminal; and wherein compensating means, for balancing said bridge in the absence of said target are connected to said second end terminal; and wherein said control signal is derived from said center tap.

3. An arrangement as set forth in claim 1 also comprising receiver amplifier means for amplifying said control signal, thus furnishing an amplified control signal.

4. An arrangement as set forth in claim 3 also comprising variable gain amplifier means coupled to said receiver amplifier means, for generating a gain control signal for controlling the gain of said receiver amplifier means in such a manner that said amplified control signal varies linearly with the distance of said target from said given location.

5. An arrangement as set forth in claim 4, wherein said variable gain amplifier means also furnish a second gain control signal for controlling the gain of said variable gain amplifier means.

6. An arrangement as set forth in claim 4, wherein said indicator means comprise an electromechanical measuring instrument.

7. An arrangement as set forth in claim 6, wherein said indicator means comprise a motor having a shaft; and means responsive to rotational movement of said shaft for rebalancing said bridge during measurement, the position of said shaft thus yielding an indication of the measured distance.

8. An arrangement as set forth in claim 1 also comprising differentiating means for differentiating said indicator signal, thus yielding a differentiated indicator signal signifying the rate of change of distance.

9. An arrangement as set forth in claim 7, wherein said motor is a two-phase motor; also comprising means for generating a modulation signal having a modulation frequency; means for modulating said carrier signal with said modulation frequency prior to application to said balanced bridge means; wherein said synchronous demodulator means yields an indicator signal having said modulation frequency; means for applying indicator signal having said modulation frequency to one phase of said two-phase motor; means for shifting said modulation signal by 90°, thus generating a phase shifted modulation signal; and means for applying said phase shifted modulation signal to the second winding of said two-phase motor.